United States Patent
Yule

(10) Patent No.: US 7,765,064 B2
(45) Date of Patent: Jul. 27, 2010

(54) COMPUTER PROGRAMMED WITH GPS SIGNAL PROCESSING PROGRAMS

(75) Inventor: Andrew Thomas Yule, East Grinstead (GB)

(73) Assignee: NXP B.V., Eindhoven (NL)

( * ) Notice: Subject to any disclaimer, the term of this patent is extended or adjusted under 35 U.S.C. 154(b) by 742 days.

(21) Appl. No.: 11/574,230

(22) PCT Filed: Aug. 19, 2005

(86) PCT No.: PCT/IB2005/052740

§ 371 (c)(1),
(2), (4) Date: Feb. 23, 2007

(87) PCT Pub. No.: WO2006/021921

PCT Pub. Date: Mar. 2, 2006

(65) Prior Publication Data

US 2007/0213932 A1    Sep. 13, 2007

(30) Foreign Application Priority Data

Aug. 23, 2004   (EP) ................................ 0418766

(51) Int. Cl.
*G01S 1/00*   (2006.01)
*G01S 5/14*   (2006.01)
(52) U.S. Cl. ................... 701/213; 342/357.06
(58) Field of Classification Search ............ None
See application file for complete search history.

(56) References Cited

U.S. PATENT DOCUMENTS

| 5,920,283 A | 7/1999 | Shaheen et al. |
| 6,182,108 B1 * | 1/2001 | Williams et al. ............ 718/102 |
| 2002/0018515 A1 | 2/2002 | Rieken et al. |
| 2003/0204550 A1 | 10/2003 | Lutter |

FOREIGN PATENT DOCUMENTS

CN   1288162 A   3/2001

OTHER PUBLICATIONS

Sun, "Guideline for Solaris Multithreading Programming", 10 pgs., Chinese original (title translated) (Apr. 2000).
Akos, et al. "Real-Time Software Radio Architecture for GPS Receivers", 10 pgs. (Jul. 2001).
Akos, et al. "Real-Time Software Radio Architecture for GPS Receivers", 18 pgs. (Jul. 2001).
Hughes, et al. "Object Oriented Multithreading Using C++" 3 pgs., Chinese original (title translated) (Apr. 2003).
Office Action in Chinese patent appln. 200580028195.X, 9 pgs., w/ English translation (Feb. 12, 2010).

* cited by examiner

Primary Examiner—Michael J. Zanelli

(57) ABSTRACT

A computer is disclosed comprising a processor able to support multithreading and concurrently programmed in at least two threads with respective GPS signal processing programs which are each capable of processing GPS signal samples outputted from the same source.

9 Claims, 1 Drawing Sheet

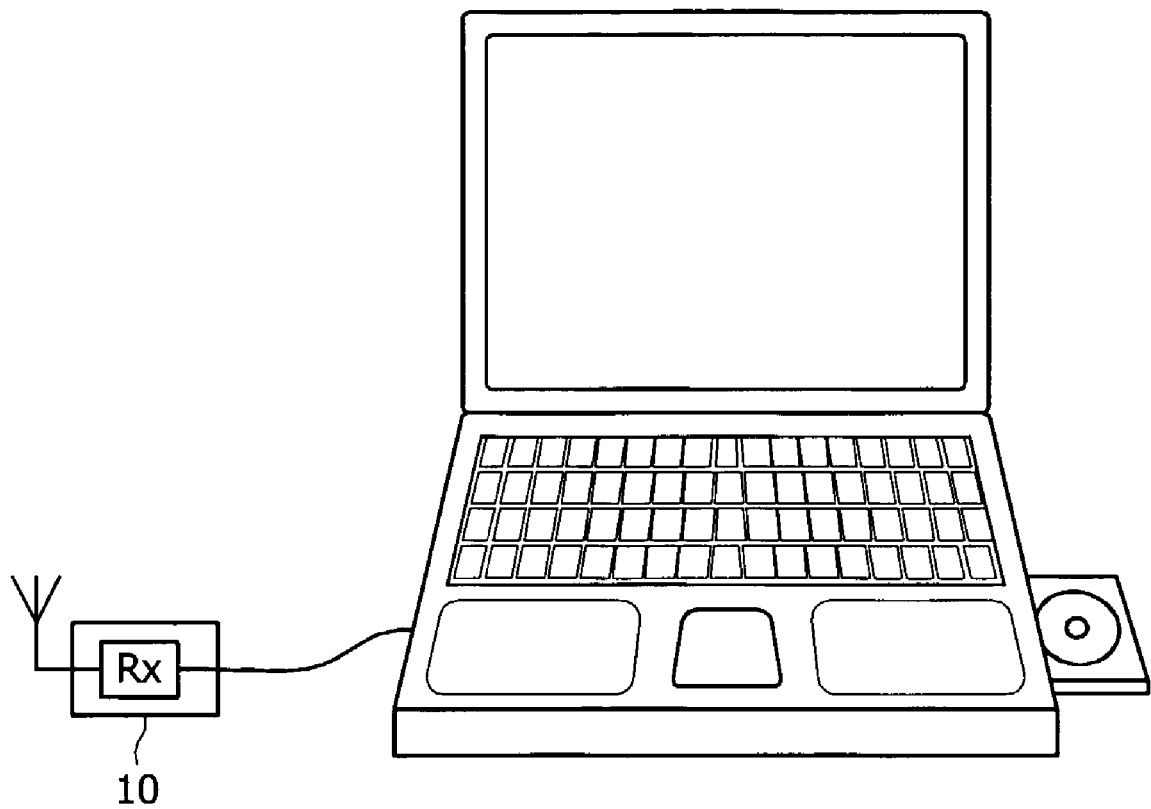

COMPUTER PROGRAMMED WITH GPS SIGNAL PROCESSING PROGRAMS

BACKGROUND OF THE INVENTION

This invention relates to a computer programmed with a GPS signal processing program capable of processing GPS signal samples.

FIELD OF THE INVENTION

Article "Real-time software radio architectures for GPS receivers" by Akos et al. (GPS World, July 2001) discloses "software GPS" in which much GPS signal processing is accomplished by means of a programmable micro-processor or digital signal processor as opposed to analogue or discrete hardwires components. As illustrated in FIG. 2 of this article, a simplified GPS receiver is provided consisting of a GPS antenna and GPS RF front-end for GPS signal pre-processing (including filtering, amplification and frequency down-conversion) and analogue to digital conversion. GPS signal samples outputted from the GPS receiver are then fed in to a modern PC or laptop running appropriate GPS signal processing software for processing the GPS signals to determine a position fix. The authors of this article have contemplated the GPS receiver to be a "plug-in" module, i.e. a "dongle" type device, which because of its simple architecture could be manufactured cheaply, thereby facilitating widespread adoption. And, of course, the GPS signal processing software which resides on the PC is inherently cheap to replicate.

BRIEF SUMMARY OF THE INVENTION

In accordance with the present invention, there is provided a computer comprising a processor able to support multi-threading and concurrently programmed in at least two threads with respective GPS signal processing programs which are each capable of processing GPS signal samples outputted from the same source.

The inventor has realised that the use of multi-threading enables sophisticated functionality to be efficiently implemented. For example, when using multi-threading:

- at least one program may perform a function with the GPS signal samples other than determining a position fix such as maintaining up to date ephemeris data which can be accessed (either directly or indirectly) by another GPS signal processing program concurrently running on another thread
- at least one program may performs the function of determining a position fix and another program performs the function of determining a different type of position fix, say a more accurate or robust position fix.
- at least one program may perform the function of determining a initial position fix and another program perform the function of determining a subsequent position fix using the initial position fix and/or other information acquired during determination of the initial position fix.

The source may be GPS receiver (either internal to or external to the computer) comprising a GPS antenna and a GPS RF front-end having an analogue to digital converter for sampling received GPS signals and a processor for outputting to the computer a stream of GPS signal samples. In such a case, it is convenience that the GPS signal processing programs are each capable of instructing the GPS receiver to output a stream of GPS signal samples. Where overlapping instructions are issued, it is convenient if the computer can combine such instructions and issue a single instruction to the GPS receiver.

BRIEF DESCRIPTION OF THE DRAWING

FIG. 1 depicts, in schematic form, a laptop PC connected to a GPS receiver in accordance with this invention.

DETAILED DESCRIPTION OF THE INVENTION

The present invention will now be described, by way of example only, with reference to the accompanying figure which shows, schematically, a laptop PC connected to a GPS receiver, both operating in accordance with the present invention.

Referring to the accompanying figure, the laptop PC is connected via a USB PC port and corresponding cable to the GPS receiver 10 which consists of a GPS RF front-end Rx and a GPS antenna. Whilst the GPS receiver could have been a "dongle" type device thereby omitting the cable, the cable facilitates positioning of the GPS receiver (including the antenna) in a prominent position, thereby increasing the chances of acquiring GPS signals. For example, one might place the GPS receiver near a window if operating in doors.

When operative, the GPS receiver receives NAVSTAR SPS GPS signals through its antenna and pre-process them, typically by passive bandpass filtering in order to minimise out-of-band RF interference, preamplification, down conversion to an intermediate frequency (IF) and analogue to digital conversion. The resultant GPS signal samples contain the IF signal which remains modulated, still containing all the information from the available satellites.

The GPS signal samples are outputted from the GPS receiver via the USB link into PC memory (not shown) with periodic timestamps inserted in the stream in place of some of the GPS signal samples and indicating the timing of the sampling of the GPS signals (relative to the time base of the GPS RF front-end).

Using laptop PC based GPS signal processing software the GPS signal samples are then processed using timestamps so that GPS signals may acquired for the purpose of deriving pseudorange information from which the position of the PC can be determined using conventional navigation algorithms. GPS signal acquisition and pseudorange processing is well known, for example, see GPS Principles and Applications (Editor, Kaplan) ISBN 0-89006-793-7 Artech House.

In order to track a GPS receiver using such an arrangement, a first position fix would normally (in the absence of AGPS data) require acquisition and tracking of the GPS signals over ~30s to ensure reception of the GPS time of week (TOW) and up to date ephemeris data.

Thereafter, one would not normally continuous track GPS signals as perhaps one would with a conventional hardware based GPS receiver but rather one would periodically resample and timestamp small blocks of GPS signals (commonly termed "snapshots") and reacquire the GPS signals for each block. A position fix on such small snapshots is possible as the time difference between successive snapshots is known (using the timestamps) and hence a measurement of GPS time for a earlier snapshot can then be extrapolated to obtain an estimate of GPS time for a later snapshot for which reacquisition has yet to occur. In addition, ephemeris and estimates of GPS time can be used to simplify the acquisition process as assumptions can be made about observed Doppler and the code phases of the GPS signals in a particular snapshot A timestamp may be identified by searching in the stream of GPS signal samples for an expected instance of a timestamp based on a previously identified instance of timing data (i.e. by counting samples) or, alternatively, where synchronisation code word is used, by searching in the stream of GPS signal samples for such a synchronisation code word. Ideally, if a synchronisation code word is used, it is chosen so as to have a very low probability of appearing in a GPS signal sample stream.

In accordance with the present invention, the GPS signal processing software comprises several individual programs running concurrently on respective threads.

A first program performs a convention GPS position fix in that it performs acquisition and tracking from a cold start (where the GPS receiver has a current almanac but not up to date ephemeris data) over 30s or more and in doing so obtains up to date ephemeris needed to determine a position.

A second program maintains up to ephemeris data for all current satellites in view and stores this data in a cache accessible by any GPS signal processing program requiring this information.

A third program performs the function of determining periodic, background position fixes (e.g. once per minute) after the first position fix has been done using cached ephemeris and an estimate of the GPS time of week (TOW) which is an extrapolation from earlier determination of the GPS TOW and the internal clock of the PC.

After an initial execution of the first program and second program, the first program might be closed and the third program executed in its place.

A fourth program which is executed at the user's requests also performs the function of determining a position fix using cached ephemeris and an estimate of the GPS time of week (TOW) but does so immediately and also where pseudorange measurement is done more accurately by processing an extended snapshot of GPS data.

All four programs are capable of instructing the external GPS receiver to instruct it to GPS receiver receive, pre-process and sample GPS signals, and to output the GPS signal samples to the PC.

Overlapping instructions issued any pair or more of the GPS signal processing programs are reconciled, e.g. by the PC's for device driver for the external GPS receiver. For example, the second program may have requested a 6s recording of IF data for maintaining ephemeris data when the user instructs the PC to determine an immediate and accurate position fix using the fourth program. The IF data which has just been recorded for the maintaining of ephemeris function can readily be used for determining such a position fix and hence the external GPS receiver is not further instructed to output additional IF data.

Whilst the present invention has been illustrated in the context of a laptop PC, it is of course equally applicable to other apparatus able to support GPS signal processing software and to which a GPS receiver according to the present invention can be connected. For example, the invention may be employed with mobile devices such as PDAs and telephone; or generally stationary objects such as a TVs or TV set-top boxes.

Also, whilst the connection between the GPS receiver and the GPS signal processing software is entirely wired in the above example, it could conceivable involve a wireless link.

Finally, whilst the invention has been described in the context of NAVSTAR GPS, the all weather, spaced based navigation system developed and currently operated by the US Department of Defense, it will be appreciated that the invention is equally applicable to other global positioning systems including GLONASS and Galileo and hybrids thereof.

The invention claimed is:

1. A computer comprising a processor able to support multi-threading and concurrently programmed in at least two threads with respective GPS signal processing programs which are each capable of processing GPS signal samples outputted from the same source.

2. A computer according to claim 1 wherein the source is a GPS receiver comprising a GPS antenna and a GPS RF front-end having an analogue to digital converter for sampling received GPS signals and a processor for outputting to the computer a stream of GPS signal samples.

3. A computer according to claim 2 wherein the GPS signal processing programs are each capable of instructing the GPS receiver to output a stream of GPS signal samples.

4. A computer according to claim 3 further configured to combine overlapping instructions from the GPS signal processing programs and to issue a single instruction to the GPS receiver.

5. A computer according to claim 1 wherein at least one program performs a function with the GPS signal samples other than determining a position fix.

6. A computer according to claim 1 wherein at least one program performs the function of maintaining up to date ephemeris data which can be accessed, by another GPS signal processing program concurrently running on another thread.

7. A computer according to claim 1 wherein at least one program performs the function of determining a position fix and another program performs the function of determining a different type of position fix.

8. A computer according to claim 7 wherein at least one program performs the function of determining a position fix and another program performs the function of determining a slower but more accurate or robust position fix.

9. A computer according to claim 7 wherein at least one program performs the function of determining a initial position fix and another program performs the function of determining a subsequent position fix using the initial position fix and/or other information acquired when determining the initial position fix.

* * * * *